United States Patent
Lee et al.

(10) Patent No.: US 12,191,456 B2
(45) Date of Patent: Jan. 7, 2025

(54) BATTERY CELL LEAK INSPECTION DEVICE AND BATTERY CELL LEAK INSPECTION METHOD

(71) Applicant: Samsung SDI Co., Ltd., Yongin-si (KR)

(72) Inventors: Seungjae Lee, Yongin-si (KR); Sukkeun Kang, Yongin-si (KR); Kyeongseon Yoo, Yongin-si (KR); Youngmin Kim, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 0 days.

(21) Appl. No.: 18/418,114

(22) Filed: Jan. 19, 2024

(65) Prior Publication Data

US 2024/0162502 A1    May 16, 2024

Related U.S. Application Data

(63) Continuation of application No. 16/980,102, filed as application No. PCT/KR2019/002388 on Feb. 27, 2019, now Pat. No. 11,916,199.

(30) Foreign Application Priority Data

Mar. 13, 2018   (KR) ........................ 10-2018-0029278

(51) Int. Cl.
*H01M 10/42* (2006.01)
*G01B 7/06* (2006.01)
*G01M 3/36* (2006.01)

(52) U.S. Cl.
CPC .......... *H01M 10/4228* (2013.01); *G01B 7/06* (2013.01); *G01M 3/36* (2013.01)

(58) Field of Classification Search
CPC ........ H01M 10/4228; G01B 7/06; G01M 3/36
(Continued)

(56) References Cited

U.S. PATENT DOCUMENTS

| | | |
|---|---|---|
| 2004/0134259 A1 | 7/2004 | Haug et al. |
| 2005/0079620 A1 | 4/2005 | Eberhard et al. |

(Continued)

FOREIGN PATENT DOCUMENTS

| | | |
|---|---|---|
| JP | 10-172618 A | 6/1998 |
| JP | 2004-152732 A | 5/2004 |

(Continued)

OTHER PUBLICATIONS

International Search Report for corresponding International Application No. PCT/KR2019/002388, dated Jun. 7, 2019, 2pp.

*Primary Examiner* — James M Erwin
(74) *Attorney, Agent, or Firm* — Lewis Roca Rothgerber Christie LLP

(57) ABSTRACT

An apparatus and a method for inspecting a leak of a battery cell are provided. An apparatus for inspecting a battery cell leak to inspect whether a battery cell leaks includes: a vacuum chamber including an upper chamber and a lower chamber and configured to set a receiving space to a controlled pressure different from an external first pressure, the upper chamber and the lower chamber being arranged to face each other with the receiving space for a battery cell therebetween and providing sealing for the receiving space; a vacuum pipe valve fluidly connected to the receiving space for the battery cell to set the receiving space to a second pressure less than the first pressure; and a thickness measuring sensor configured to measure a before-vacuum thickness of the battery cell under the first pressure and measure an after-vacuum thickness of the battery cell under the second pressure.

(Continued)

According to the present disclosure, an apparatus and a method for inspecting a battery cell leak, capable of easily and precisely capturing damage to an exterior material of a battery cell are provided.

21 Claims, 9 Drawing Sheets

(58) Field of Classification Search
USPC .......................................................... 429/90
See application file for complete search history.

(56) References Cited

U.S. PATENT DOCUMENTS

| | | |
|---|---|---|
| 2008/0028860 A1 | 2/2008 | Refko et al. |
| 2014/0216139 A1 | 8/2014 | Yang |
| 2017/0033076 A1 | 2/2017 | Morita et al. |
| 2017/0074634 A1* | 3/2017 | Yoon ...................... G01B 11/06 |

FOREIGN PATENT DOCUMENTS

| | | |
|---|---|---|
| JP | 3860312 B2 | 12/2006 |
| JP | 2015-132566 A | 7/2015 |
| KR | 10-2004-0065522 A | 7/2004 |
| KR | 10-1198857 B1 | 11/2012 |
| KR | 10-1397926 B1 | 5/2014 |
| KR | 10-1456424 B1 | 10/2014 |
| KR | 10-1467340 B1 | 12/2014 |
| KR | 10-2016-0143038 A | 12/2016 |

* cited by examiner

BATTERY CELL LEAK INSPECTION DEVICE AND BATTERY CELL LEAK INSPECTION METHOD

CROSS-REFERENCE TO RELATED APPLICATION(S)

This application is a continuation of U.S. patent application Ser. No. 16/980,102, filed Sep. 11, 2020, which is a National Phase patent application of International Patent Application Number PCT/KR2019/002388, filed on Feb. 27, 2019, which claims priority of Korean Patent Application No. 10-2018-0029278, filed Mar. 13, 2018. The entire contents of both of which are incorporated herein by reference.

TECHNICAL FIELD

The present disclosure relates to an apparatus for inspecting a battery cell leak and a method of inspecting a battery cell leak.

BACKGROUND ART

Unlike a primary battery which is not rechargeable, generally, a secondary battery is rechargeable and dischargeable. A secondary battery is used as an energy source of mobile apparatuses, electric automobiles, hybrid automobiles, electric bicycles, uninterruptible power supplies, etc., and is used in the form of a single battery cell or a battery pack in which a plurality of battery cells are connected and bound in one unit, depending on the kind of an external apparatus to which the second battery is applied.

DESCRIPTION OF EMBODIMENTS

Technical Problem

Provided are an apparatus for inspecting a battery cell leak and a method of inspecting a battery cell leak, capable of easily and precisely capturing damage to an exterior material of a battery cell.

Technical Solution to Problem

According to an aspect of the present disclosure, an apparatus for inspecting a battery cell leak
to inspect whether a battery cell leaks includes:
a vacuum chamber including an upper chamber and a lower chamber and configured to set a receiving space to a controlled pressure different from an external first pressure, the upper chamber and the lower chamber being arranged to face each other with the receiving space for a battery cell therebetween and providing sealing for the receiving space;
a vacuum pipe valve fluidly connected to the receiving space for the battery cell to set the receiving space to a second pressure less than the first pressure; and
a thickness measuring sensor configured to measure a before-vacuum thickness of
the battery cell under the first pressure and measure an after-vacuum thickness of the battery cell under the second pressure.
The apparatus may further include a controller configured to determine whether the battery cell leaks based on a thickness difference between the before-vacuum thickness and the after-vacuum thickness.

As an example, the controller may compare the before-vacuum thickness with the after-vacuum thickness and determine that a leak occurs in a battery cell in which swelling occurs.

As an example, the controller may compare a reference value set in advance with the thickness difference and determine that a leak occurs in a battery cell in which a thickness difference exceeding the reference value is measured.

As an example, the apparatus may further include:
a total volatile organic compound (TVOC) pipe valve configured to suck an internal gas from an inside of the receiving space for the battery cell; and
a total volatile organic compound (TVOC) sensor arranged on a sucking flow path of the internal gas to measure a concentration of total volatile organic compound from the sucked internal gas.

As an example, the apparatus may further include
a controller configured to synthesize information regarding the before-vacuum thickness and the after-vacuum thickness transmitted from the thickness measuring sensor and information regarding the concentration of the total volatile organic compound transmitted from the TVOC sensor to determine whether a battery cell leaks.

As an example, the apparatus may further include
a destroy pipe valve configured to set the receiving space for the battery cell to a third pressure higher than the second pressure,
wherein the TVOC pipe valve may provide a negative pressure lower than the third pressure to forcibly suck the internal gas from the inside of the receiving space set to the third pressure.

As an example, the receiving space may be provided in plural, and the vacuum pipe valve, the TVOC pipe valve, and the destroy pipe valve may be
arranged in a position of the upper chamber between the plurality of receiving spaces, fluidly connected to the plurality of receiving spaces, and may set a pressure shared by the plurality of receiving spaces.

As an example, the thickness measuring sensor may be provided at a position of the upper chamber that faces the receiving space and arranged to face a battery cell inside the receiving space.

As an example, the thickness measuring sensor may be a non-contact type eddy current sensor,
wherein an insulating block may be assembled in the upper chamber, the insulating block surrounding and insulating the thickness measuring sensor.

The thickness measuring sensor may be provided in plural to correspond to the receiving spaces, respectively.

As an example, the first pressure may correspond to the atmospheric pressure.

As an example, a seat jig may be assembled in the lower chamber, a plurality of receiving spaces being provided in the seat jig.

As an example, the apparatus may perform inspection on the seat jig basis.

According to another aspect of the present disclosure, a method of inspecting a battery cell leak
using an inspection apparatus including a vacuum chamber and a vacuum pipe valve for controlling a pressure of an inside of the vacuum chamber, the vacuum chamber including an upper chamber and a lower chamber, includes:
placing a battery cell to an inspection position such that an inspection stage is provided, in which the upper chamber and the lower chamber are arranged to face each other with a receiving space for the battery cell therebetween;

sealing the receiving space by lowering the upper chamber toward the lower chamber;

maintaining the vacuum pipe valve in an off-state to maintain the receiving space of the battery cell at a first pressure which is the same as before the sealing of the vacuum chamber and measuring a before-vacuum thickness of the battery cell under the first pressure;

switching the vacuum pipe valve to an on-state to set the receiving space of the battery cell to a second pressure lower than the first pressure; and measuring an after-vacuum thickness of the battery cell under the second pressure.

As an example, the method may further include determining whether the battery cell leaks based on a thickness difference between the before-vacuum thickness and the after-vacuum thickness.

As an example, the determining of whether the battery cell leaks may include comparing the before-vacuum thickness with the after-vacuum thickness and determining that a leak occurs in the battery cell in which swelling occurs.

As an example, the method may further include switching a destroy pipe valve fluidly connected to the receiving space for the battery cell to an on-state to set the receiving space to a third pressure higher than the second pressure; and forcibly sucking an internal gas from an inside of the receiving space set to the third pressure and measuring a concentration of total volatile organic compound from the sucked internal gas.

As an example, the method may further include synthesizing a thickness difference between the before-vacuum thickness and the after-vacuum thickness, and the concentration of the total volatile organic compound to determine whether the battery cell leaks.

As an example, the placing of the battery cell to the inspection position may include assembling a seat jig in the lower chamber, receiving spaces for a plurality of battery cells being provided in the seat jig; and moving the lower chamber receiving the plurality of battery cells to a waiting position of the upper chamber.

As an example, the method may further include raising the upper chamber in a direction away from the lower chamber to discharge an inspection-completed battery cell.

Advantageous Effects of Disclosure

According to the present disclosure, whether an exterior material of a battery cell is damaged may be precisely and easily captured by calculating a thickness difference between a before-vacuum thickness and an after-vacuum thickness of the battery cell under different pressures, and determining that a battery cell in which swelling occurs is a defective product in which a leak occurs based on the calculated thickness difference.

BRIEF DESCRIPTION OF DRAWINGS

FIGS. 7 and 8 are cross-sectional views of an apparatus for inspecting a leak, taken along line VII-VII of FIG. 6.

BEST MODE

According to an aspect of the present disclosure, an apparatus for inspecting a battery cell leak
to inspect whether a battery cell leaks includes:
a vacuum chamber including an upper chamber and a lower chamber and configured to set a receiving space to a controlled pressure different from an external first pressure, the upper chamber and the lower chamber being arranged to face each other with the receiving space for a battery cell therebetween and providing sealing for the receiving space;
a vacuum pipe valve fluidly connected to the receiving space for the battery cell to set the receiving space to a second pressure less than the first pressure; and
a thickness measuring sensor configured to measure a before-vacuum thickness of the battery cell under the first pressure and measure an after-vacuum thickness of the battery cell under the second pressure.

According to another aspect of the present disclosure, a method of inspecting a battery cell leak
using an inspection apparatus including a vacuum chamber and a vacuum pipe valve for controlling a pressure of an inside of the vacuum chamber, the vacuum chamber including an upper chamber and a lower chamber, includes:
placing a battery cell to an inspection position such that an inspection stage is provided, the upper chamber and the lower chamber are arranged to face each other with a receiving space for the battery cell therebetween in the inspection stage;
sealing the receiving space by lowering the upper chamber toward the lower chamber;
maintaining the vacuum pipe valve in an off-state to maintain the receiving space of the battery cell in a first pressure as before sealing of the vacuum chamber and measuring a before-vacuum thickness of the battery cell under the first pressure;
switching the vacuum pipe valve to an on-state to set the receiving space of the battery cell to a second pressure less than the first pressure; and
measuring an after-vacuum thickness of the battery cell under the second pressure.

MODE OF DISCLOSURE

Hereinafter, an apparatus for inspecting a leak of a battery cell B according to an embodiment is described with reference to the accompanying drawings.

Figure 1:
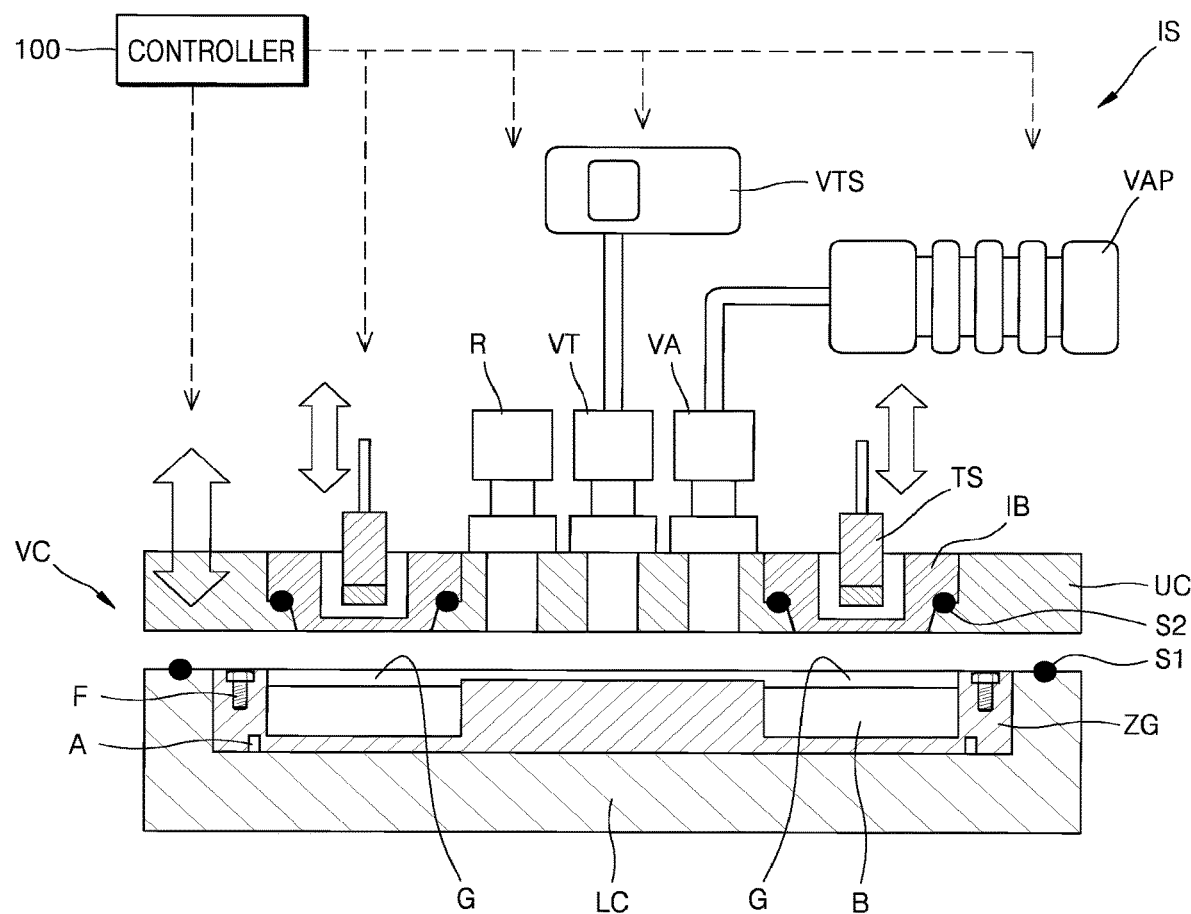
FIG. 1 is a view of an apparatus for inspecting a battery cell leak according to an embodiment.
Figure 2:
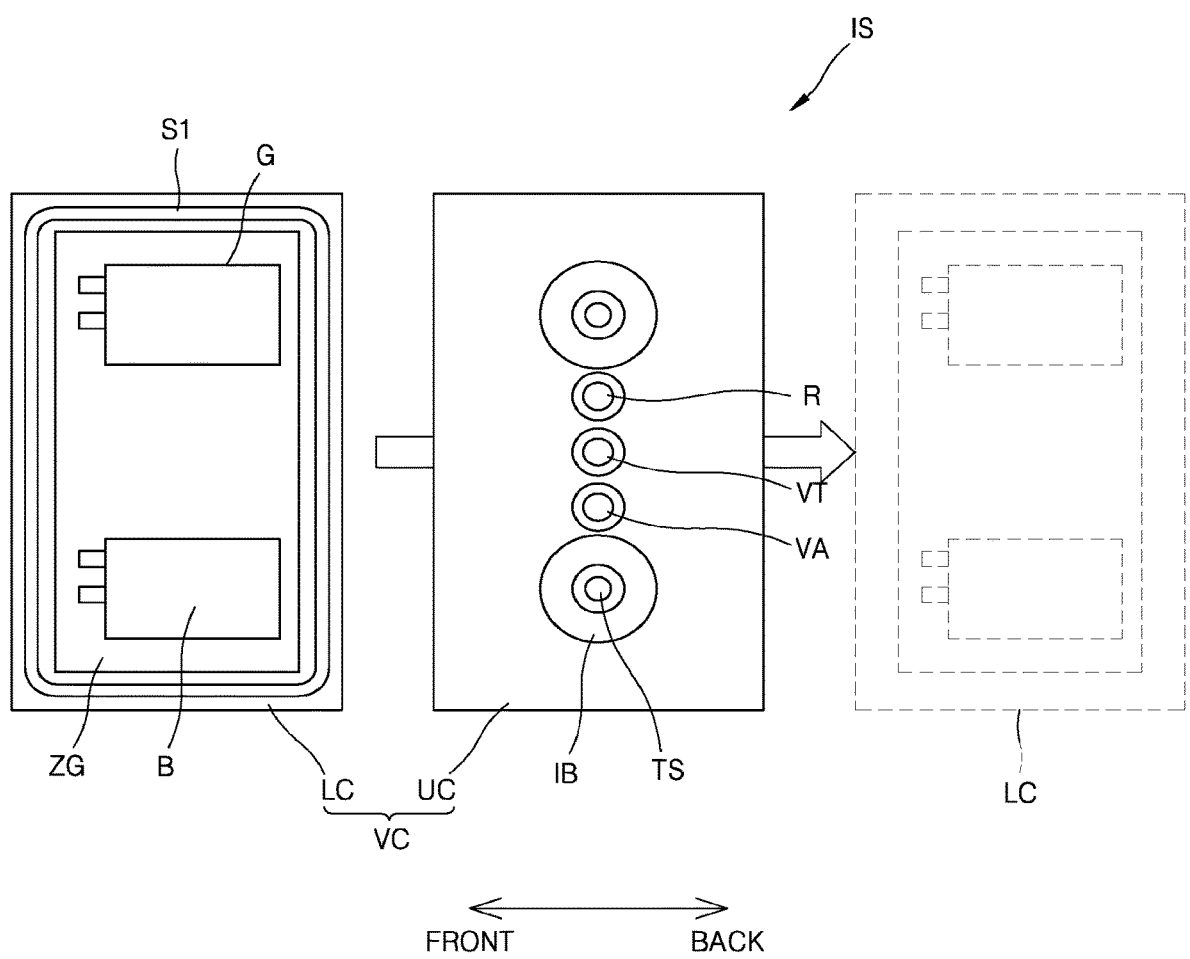
FIG. 2 is a view of an apparatus for inspecting a battery cell leak shown in FIG. 1, for explaining a transfer operation of placing a battery cell to an inspection stage in the apparatus for inspecting a battery cell leak shown in FIG. 1.
Figure 3:
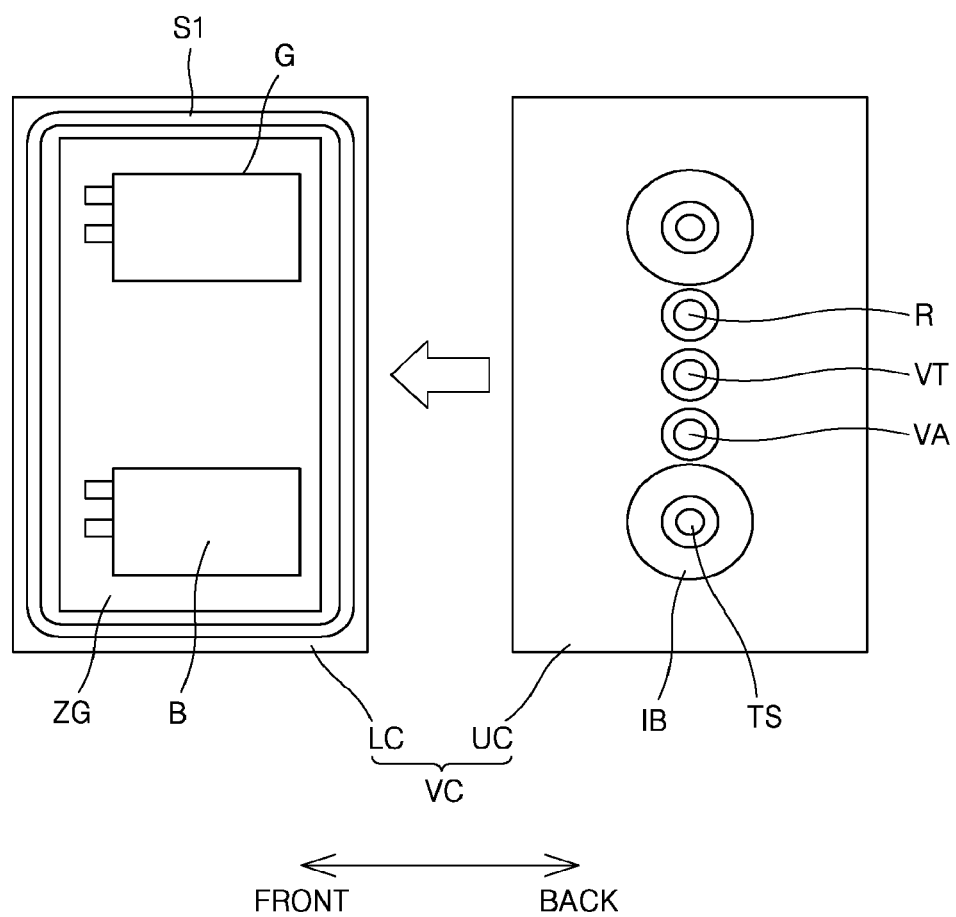
FIG. 3 is a view for explaining a transfer operation of placing a battery cell to an inspection stage in the apparatus for inspecting a battery cell leak shown in FIG. 1 and is a view for explaining a modified embodiment of FIG. 2.

FIG. 1 is a view of an apparatus for inspecting a battery cell leak according to an embodiment. FIG. 2 is a view of an apparatus for inspecting a battery cell leak shown in FIG. 1, for explaining a transfer operation of placing a battery cell to an inspection stage in the apparatus for inspecting a battery cell leak shown in FIG. 1. FIG. 3 is a view for explaining a transfer operation of placing a battery cell to an inspection stage in the apparatus for inspecting a battery cell leak shown in FIG. 1 and is a view for explaining a modified embodiment of FIG. 2.

Referring to the drawings, the apparatus for inspecting a leak of a battery cell B may include a vacuum chamber VC and various pipe valves VA, VT, and R, the vacuum chamber VC including an upper chamber UC and a lower chamber LC arranged to face each other with a receiving space G for the battery cell B therebetween, and the various pipe valves VA, VT, and R on/off-operating to set the receiving space G for the battery cell B to a controlled pressure different from an external first pressure or to forcibly suck an internal gas from the inside of the receiving space G for the battery cell B. In addition, the apparatus for inspecting a leak of a battery cell B may include a thickness measuring sensor TS and a total volatile organic compound (TVOC) sensor VTS, the thickness measuring sensor TS being configured to measure a before-vacuum thickness of the battery cell B and an after-vacuum thickness of the battery cell B, and the TVOC sensor VTS being arranged on a suction flow path to measure the concentration of total volatile organic compound TVOC from an internal gas forcibly sucked from the inside of the receiving space G of the battery cell B. In addition, the apparatus for inspecting a leak of a battery cell B may include a controller 100 configured to generally control the operations of the vacuum chamber VC, the various pipe valves VA, VT, and R, the thickness measuring sensor TS, and the TVOC sensor VTS, receive measurement results of the thickness measuring sensor TS and the TVOC sensor VTS, and determine whether the battery cell B leaks based on the measurement results.

The vacuum chamber VC may provide sealing for maintaining a second pressure (a vacuum pressure) relatively lower than the first pressure corresponding to the atmospheric pressure. The apparatus for inspecting a leak according to an embodiment determines whether the battery cell B leaks by capturing swelling of the battery cell B under the second pressure (the vacuum pressure) lower than the first pressure (ex. the atmospheric pressure), and, for this purpose, may measure the thickness of the battery cell B in the vacuum chamber VC in which the vacuum pressure may be maintained. That is, the apparatus for inspecting a leak according to an embodiment may measure a before-vacuum thickness under the first pressure, measure an after-vacuum thickness under the second pressure, calculate a thickness difference between the before-vacuum thickness and the after-vacuum thickness, and determine that a battery cell B in which swelling occurs is a defective product in which a leak occurs based on the calculated thickness difference.

Since the vacuum chamber VC provides sealing of the receiving space for the battery cell B, the pressure of the receiving space G may be easily controlled, and as described below, setting of the vacuum lower than the first pressure (ex. the atmospheric pressure) and destruction of the vacuum may be easily controlled depending on each operation of the leak inspection.

Throughout the present specification, the first pressure may correspond to the atmospheric pressure, which is an external pressure of the vacuum chamber VC. Even in the state in which the upper chamber UC and the lower chamber LC are in close contact with each other, under a state in which the various pipe valves VA, VT, and R that are fluidly connected to the receiving space G of the battery cell B do not operate, the receiving space G of the battery cell B may be maintained at the first pressure. The second pressure is a vacuum state lower than the first pressure and may correspond to a pressure of a state in which the upper chamber UC and the lower chamber LC are in close contact with each other and thus the vacuum chamber VC is sealed, and the vacuum pipe valve VA fluidly connected to the receiving space G for the battery cell B is switched to an on-state to set the receiving space for the battery cell B to vacuum.

The upper chamber UC and the lower chamber LC may be driven to approach each other or to be spaced apart from each other with the receiving space G for the battery cell B therebetween. As an example, the upper chamber UC may descend toward the lower chamber LC and be in close contact with the lower chamber LC at a preset pressure to seal the vacuum chamber VC and seal the receiving space G for the battery cell B from the outside. In addition, the upper chamber UC may ascend away from the lower chamber LC to open the vacuum chamber VC and expose the receiving space G for the battery cell B to the outside.

The apparatus for inspecting a leak according to an embodiment is applicable to a successive inspection method in which, while a battery cell B, which is an inspection object, is successively supplied in one direction (a back-and-forth direction), an inspection-completed battery cell B is discharged and an inspection object is moved to the next battery cell B. As an example, one of the upper chamber UC and the lower chamber LC may be driven in one direction (the back-and-forth direction) to move an inspection stage IS from an inspection-completed battery cell B to the next battery cell B, and the other of the upper chamber UC and the lower chamber LC waits for the one of the chambers in the inspection stage IS. In addition, the upper chamber UC and the lower chamber LC arranged to face each other in the inspection stage IS approach each other and are in close contact with each other to seal the receiving space G (sealing of the vacuum chamber VC). In the sealed receiving space G, a pressure thereof may be easily controlled under control of the controller 100, and the pressure may be set to the second pressure of the vacuum lower than the first pressure (ex. the atmospheric pressure), or set to the third pressure (ex. the atmospheric pressure) higher than the second pressure with the vacuum destroyed. In addition, an inspection-completed battery cell B may be discharged, and one of the upper chamber UC and the lower chamber LC may be driven in a direction (the back-and-forth direction) away from each other to move the inspection stage IS to the next battery cell B. With the receiving space G open, the inspection-completed battery cell B may be discharged, and one of the upper chamber UC and the lower chamber LC may move toward a battery cell B, which is the next inspection object.

In an embodiment shown in FIG. 2, the lower chamber LC may be driven in one direction (the back-and-forth direction) and may serve as a transfer means supplying a battery cell B, which is an inspection object. The lower chamber LC may receive a plurality of battery cells B and supply a battery cell BB to the inspection stage IS in which the upper chamber UC waits.

In an embodiment shown in FIG. 3, the upper chamber UC may be driven in one direction (the back-and-forth direction) and driven in one direction (the back-and-forth direction) toward the inspection stage IS in which the lower chamber LC waits, a battery cell B, which is an inspection object, being seated on the lower chamber LC. The upper chamber UC may perform leak inspection on the battery cell B waiting together with the lower chamber LC in the inspection stage IS.

Referring to FIG. 1, a seat jig ZG including the receiving space G for the plurality of battery cells B may be assembled to the lower chamber LC. A jig groove may be formed in the lower chamber LC, the seat jig ZG being assembled to the jig groove. The seat jig ZG may be adaptively provided depending on the shape and the size of the battery cell B, which is an inspection object. For this purpose, the seat jig ZG may be variously prepared to have the receiving spaces G of various shapes and sizes. In addition, through a simple operation of replacing the seat jig ZG inside the lower chamber LC while using the same upper chamber UC and the same lower chamber LC, a leak inspection may be performed on the battery cells B of various sizes and shapes. In the present disclosure, to perform a leak inspection on battery cells B of various sizes and shapes, leak inspection apparatuses of various shapes are not individually required. Instead, one leak inspection apparatus is used to perform a leak inspection on battery cells B of various sizes and shapes by replacing with a matching seat jig ZG according to various sizes and shapes.

For assembling between the seat jig ZG and the lower chamber LC, a position alignment means may be provided to the seat jig ZG and the lower chamber LC. As an example, a position alignment pin A may be formed in the lower chamber LC, and a position alignment groove may be formed in the seat jig ZG to prevent misalignment between the lower chamber LC and the seat jig ZG. As an example, the position alignment pin A and the position alignment groove may be formed on the left and right around the center of the lower chamber LC and the seat jig ZG.

The seat jig ZG and the lower chamber LC may be fixed in position with respect to each other. As an example, a bolt as a fixing means F may be fastened to the seat jig ZG. The fixing means F may pass through the seat jig ZG and be fastened to the lower chamber LC to fix the seat jig ZG and the lower chamber LC in position with each other.

The seat jig ZG may include an insulating material to insulate the battery cell B, not to generate an electric short-circuit even when contacting the battery cell B, and to block an electric interference with the battery cell B.

The receiving space G that may receive the battery cell B may be prepared in the seat jig ZG. The receiving space G for the battery cell B may be formed in a size such that a clearance of 0.5 mm to 1 mm may be secured greater than the external shape of the battery cell B not to damage the battery cell B, particularly an exterior material BP (see FIG. 4) of the battery cell B due to physical interference with the battery cell B during attachment/detachment of the battery cell B while solidly fixing the battery cell B in position. An edge portion of the receiving space G for the battery cell B may be round-processed such that defects such as starches or chopping may not be caused to the battery cell B, particularly, the exterior material BP (see FIG. 4) of the battery cell B due to physical interference or friction with the battery cell B.

The seat jig ZG may include a plurality of receiving spaces G which may respectively receive a plurality of battery cells B. The apparatus for inspecting a leak according to an embodiment does not perform a leak inspection on a battery cell B basis but may perform a leak inspection on a seat jig ZG basis. The apparatus for inspecting a leak according to an embodiment may simultaneously perform a leak inspection on a plurality of battery cells B by performing a leak inspection in unit of a seat jig ZG which receives a plurality of battery cells B. Accordingly, a process time for performing a leak inspection on the plurality of battery cells B may be reduced. As an example, one seat jig ZG may receive a plurality of battery cells, for example, 20 battery cells B simultaneously.

When the lower chamber LC that receives the plurality of battery cells B is transferred to the inspection stage IS facing the upper chamber UC, the upper chamber UC that is waiting may descend toward the lower chamber LC. The upper chamber UC may be in close contact with the lower chamber LC to seal the receiving space G (sealing of the vacuum chamber VC) inside the lower chamber LC (more specifically, the seat jig ZG assembled to the lower chamber LC). A first sealing member S1 may be arranged between the lower chamber LC and the upper chamber UC. Since the lower chamber LC and the upper chamber UC are in contact with each other at a preset pressure with the first sealing member S1 therebetween, pressure leakage of the receiving space G may be blocked. As an example, the first sealing member S1 may be buried in the sealing groove of the lower chamber LC and may protrude from the sealing groove of the lower chamber LC to a preset height to be in close contact with the upper chamber UC at a preset pressure, thereby sealing between the upper chamber UC and the lower chamber LC. As an example, the first sealing member S1 may be provided as an O-ring.

Various kinds of pipe valves VA, VT, and R for controlling the pressure of the receiving space G may be mounted on the upper chamber UC. The pipe valves VA, VT, and R may be fluidly connected to the receiving space G closed by the upper chamber UC and the lower chamber LC and may adjust the pressure of the receiving space G under control of the controller 100.

More specifically, the pipe valves VA, VT, and R may include the vacuum pipe valve VA, the TVOC pipe valve VT, and the destroy pipe valve R. The pipe valves VA, VT, and R may be periodically driven with different starting periods and different ending periods as each operation of the leak inspection is repeated. More specifically, the vacuum pipe valve VA may operate to set vacuum and provide a negative pressure to the receiving space G closed by the upper chamber UC and the lower chamber LC to set the pressure of the receiving space G to the second pressure of the vacuum lower than the first pressure (ex. the atmospheric pressure).

To measure TVOC, the TVOC pipe valve VT may provide a negative pressure to suck an internal gas of the receiving space G from the inside of the receiving space G closed by the upper chamber UC and the lower chamber LC. During the TVOC measuring operation, to capture the total volatile organic compound (TVOC) filling the inside of the receiving space G, the TVOC pipe valve VT is driven to suck an internal gas of the receiving space G. The total volatile organic compound (TVOC) may be captured by using the TVOC sensor VTS arranged on a suction flow path of the internal gas.

The destroy pipe valve R is driven to an on-state before the TVOC measurement and may destroy the vacuum state such that suction of the internal gas may be performed for TVOC measurement. As an example, the destroy pipe valve R may be switched to an on-state while the receiving space G for the battery cell B is set to the second pressure of the vacuum and may set the pressure of the receiving space G to the third pressure higher than the second pressure. As an example, the destroy pipe valve R may set the pressure inside the receiving space G to the third pressure (ex. the atmospheric pressure) by connecting the inside to the outside of the receiving space G such that the vacuum of the receiving space G closed by the upper chamber UC and the lower chamber LC is released. As the TVOC pipe valve VT is switched to an on-state to provide a negative pressure lower than the third pressure (ex. the atmospheric pressure) during the TVOC measuring operation after the vacuum destruction, the destroy pipe valve R may allow the internal gas of the receiving space G to be forcibly introduced to the suction flow path at which the TVOC sensor VTS is arranged. When the vacuum destruction does not precede, to suck the internal gas of the receiving space G under the second pressure of vacuum, a negative pressure relatively lower than the second pressure needs to be provided during the TVOC measuring operation, and an excessive burden may be put on the driving power of the inspection apparatus. Therefore, it is preferable that the TVOC measurement is performed after the vacuum destruction.

The pipe valves VA, VT, and R may be mounted on the upper chamber UC. More specifically, the pipe valves VA, VT, and R may act in common for different receiving spaces G and be provided at positions between different receiving spaces G to provide a balanced pressure for the different receiving spaces G. As an example, the different receiving spaces G may be sealed from the outside by being surrounded by the first sealing member S1 arranged between the upper chamber UC and the lower chamber LC, and fluidly connected to each other, and the pressures of the different receiving spaces G may be controlled by the pipe valves VA, VT, and R installed between the different receiving spaces G.

The thickness measuring sensor TS for capturing swelling of the battery cell B may be mounted on the upper chamber UC. In the present embodiment, the thickness measuring sensor TS may include both a contact type sensor that physically contacts the external surface of the battery cell B to measure a thickness thereof, and a non-contact type sensor that does not physically contact the external surface of the battery cell B to measure a thickness thereof. As an example, the contact type sensor may include an indicator, and the non-contact type sensor may include an eddy current sensor, a fiber sensor, a laser sensor, and a vision sensor.

The thickness measuring sensor TS may be assembled to the upper chamber UC and may approach toward the battery cell B or may be raised or lowered to be away from the battery cell B by a separate driving means (not shown) such that the thickness measuring sensor TS may be driven independently of the upper chamber UC. As an example, the thickness measuring sensor TS may be raised or lowered to directly contact the battery cell B and measure the thickness of the battery cell B, or raised or lowered to maintain a measurable distance sufficient to measure the thickness of the battery cell B even though not directly contacting the battery cell B.

As an example, the thickness measuring sensor TS may include a non-contact type eddy current sensor. The eddy current sensor may be arranged inside an insulating block IB to electrically insulate the eddy current sensor and avoid a measurement error due to electric interference. That is, for electric insulation, the thickness measurement sensor TS may be surrounded by the insulating block IB and assembled inside the upper chamber UC together with the insulating block IB. In this case, to block the leakage of vacuum through a gap between the insulating block IB and the upper chamber UC, a second sealing member S2 may be arranged at a boundary between the insulating block IB and the upper chamber UC.

The thickness measuring sensor TS may be mounted in plural to correspond to the number of receiving spaces G at positions corresponding to the different receiving spaces G. The thickness measuring sensor TS may measure the thickness of each battery cell B received in each receiving space G. The thickness measuring sensor TS may measure the thickness of the battery cell B before and after vacuum and capture whether swelling occurs based on the change of the measured thickness.

More specifically, the thickness measuring sensor TS may be driven according to a control signal of the controller 100, may compare a before-vacuum thickness with an after-vacuum thickness through two thickness measurements for the same battery cell B, and determine that the battery cell B in which an increase in thickness is captured is a battery in which a leak occurs.

Figure 4:
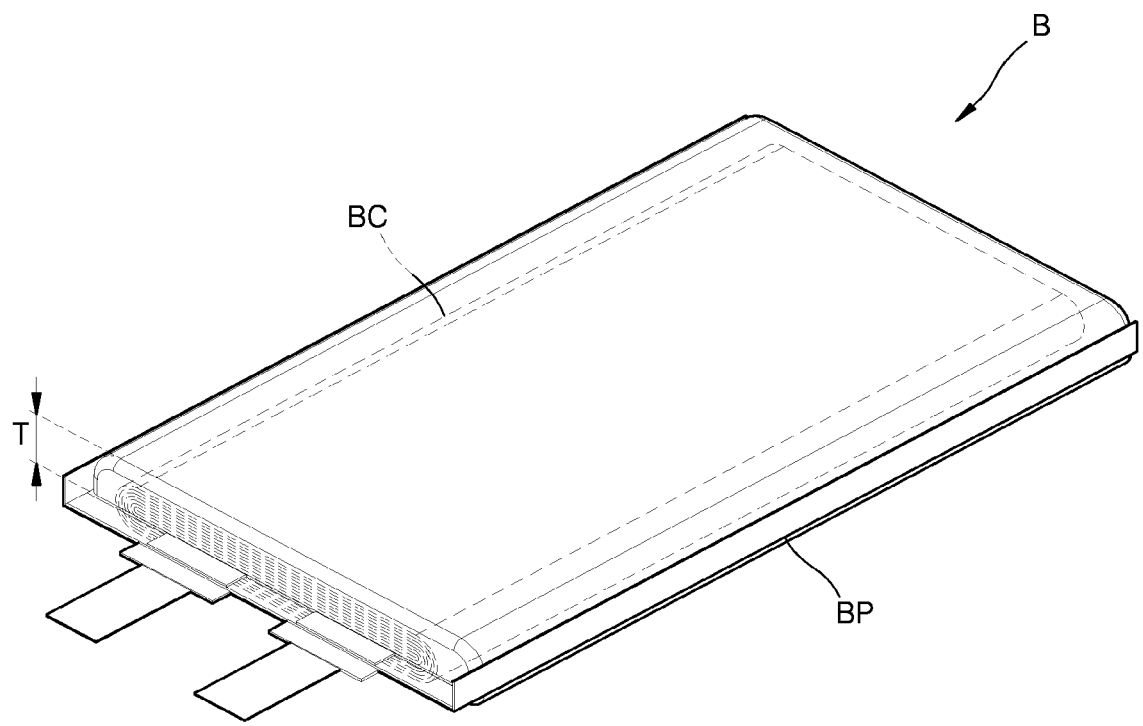
FIG. 4 is a perspective view of a battery cell which is an inspection object of the apparatus for inspecting a battery cell according to an embodiment.

FIG. 4 is a perspective view of a battery cell which is an inspection object of the apparatus for inspecting a leak according to an embodiment.

Referring to the drawing, the apparatus for inspecting a leak according to an embodiment may treat a battery cell B as an inspection object. The battery cell B may include an electrode assembly BC and an exterior material BP in which the electrode assembly BC is received. The exterior material BP may include a flexible exterior material BP such as a pouch and include an insulating layer (not shown) formed on two opposite sides of a metal thin plate (not shown). The exterior material BP may be formed to a thin thickness of 1 mm scale, and damage such as scratches of the exterior material BP or tearing of the exterior material BP may occur during forming of the exterior material BP such as drawing or packing of the electrode assembly BC using the exterior material BP. When damage occurs to the exterior material BP, a leak phenomenon may occur in which an external impurity gas flows into the battery cell B through the damaged exterior material BP due to a pressure difference between the inside and outside of the battery cell B. Since a pressure inside the exterior material BP, that is, an inner pressure of the battery cell B is set to a vacuum pressure lower than the atmospheric pressure, when a leak occurs, an external impurity gas penetrates into the battery cell B, and simultaneously with the occurrence of a leak, the inner pressure of the battery cell B is raised to a pressure of the atmospheric pressure level from the vacuum pressure lower than the atmospheric pressure due to the penetration of the external impurity gas.

The apparatus for inspecting a leak according to an embodiment measures the thickness T (a before-vacuum thickness) of the battery cell B before vacuum is set, that is, under a first pressure (ex. the atmospheric pressure), and measures the thickness T (an after-vacuum thickness) of the battery cell B under a second pressure lower than the first pressure (ex. the atmospheric pressure) inside the receiving space G for the battery cell B sealed by the upper chamber UC and the lower chamber LC. A difference between the before-vacuum thickness and the after-vacuum thickness does not occur to a normal battery cell B in which a leak does not occur. In a normal battery cell B, since any of the first pressure (ex. the atmospheric pressure) before the vacuum and the second pressure after the vacuum is still greater than the inner pressure of the battery cell B, the battery cell B is subjected to compression pressure that tends to shrink the battery cell B from the outside, and as a result, swelling does not occur and there is no change in thickness before and after vacuum. In contrast, in a defective battery cell B in which a leak occurs, swelling occurs due to a pressure change before and after vacuum, and as a result, a difference between a before-vacuum thickness and an after-vacuum thickness occurs. That is, in a defective battery cell B, an external impurity gas penetrates into the battery cell B due to the damage such as starches or tearing of the exterior material BP and the inner pressure of the battery cell B is raised to the atmospheric pressure higher than an initially set inner pressure or a level close to the atmospheric pressure. In this case, in a defective battery cell B, no special abnormalities may not be captured under the first pressure (ex. the atmospheric pressure) before vacuum, but under the second pressure lower than the first pressure (ex. the atmospheric pressure), the inner pressure (the atmospheric pressure due to the damage of the exterior material BP) of the battery cell B is higher than the external pressure (the second pressure, a vacuum pressure). Swelling in which the battery cell B expands occurs due to the pressure difference between the inside and outside of the battery cell B. For this reason, in a defective battery cell B, a thickness after vacuum increases compared to a thickness before vacuum. Determining whether the battery cell B is defective may be made based on a thickness change before and after vacuum.

The thickness before vacuum may denote the thickness T of the battery cell B measured under the relatively high first pressure (ex. the atmospheric pressure) before vacuum is set. The thickness T of the battery cell B may be measured with a direction perpendicular to a primary surface of the battery cell B, that is, the primary surface that occupies a largest area of the battery cell B as a thickness direction. In this case, the thickness before vacuum may be measured under the relatively high first pressure (ex. the atmospheric pressure) before vacuum is set. Even when the upper chamber UC and the lower chamber LC are in close contact with each other and thus the vacuum chamber VC is sealed, while the various pipe valves VA, VT, and R fluidly connected to the receiving space G for the battery cell B do not operate, the receiving space G for the battery cell B may be maintained at the first pressure (ex. the atmospheric pressure) that is the same as the outside of the vacuum chamber VC. Even right after the upper chamber UC and the lower chamber LC are sealed, as long as the various pipe valves VA, VT, and R do not operate, the receiving space G for the battery cell B between the upper chamber UC and the lower chamber LC may still maintain the same pressure as the first pressure (ex. the atmospheric pressure) of the outside of the vacuum chamber VC.

The before-vacuum thickness of the battery cell B may be measured under a state in which the upper chamber UC and the lower chamber LC each providing sealing for the receiving space G are in close contact with each other to face each other and thus the vacuum chamber VC is sealed, and vacuum of the receiving space G is not set by the vacuum pipe valve VA. The upper chamber UC and the lower chamber LC may be in close contact with each other for measurement of thicknesses before and after vacuum, and the thickness measuring sensor TS mounted on the upper chamber UC may perform the thickness measurement on the battery cell B arranged to face the thickness measuring sensor TS inside the lower chamber LC according to a control signal of the controller 100. That is, while the thickness measuring sensor TS and the battery cell B are arranged to face each other at corresponding positions of the upper chamber UC and the lower chamber LC, thickness measurement before vacuum may be performed.

The thickness after vacuum may denote the thickness T of the battery cell B measured under the relatively low second pressure after vacuum is set, and the thickness T of the battery cell B may be measured with a direction perpendicular to the primary surface of the battery cell B as a thickness direction. In this case, the thickness after vacuum may be measured under the relatively low second pressure after vacuum is set, for example, under a vacuum pressure lower than the first pressure (ex. the atmospheric pressure). The thickness after vacuum may be measured under a state in which the upper chamber UC and the lower chamber LC each providing sealing for the receiving space G are in close contact with each other to face each other and vacuum for the receiving space G is set and maintained by the vacuum pipe valve VA. The upper chamber UC and the lower chamber LC may be in close contact with each other for thickness measurement before and after vacuum, and the thickness measuring sensor TS mounted on the upper chamber UC may perform thickness measurement on the battery cell B arranged to face the thickness measuring sensor TS inside the lower chamber LC according to a control signal of the controller 100. That is, the thickness after vacuum may be measured at positions where the thickness measuring sensor TS and the battery cell B are arranged to face each other in the upper chamber UC and the lower chamber LC.

The apparatus for inspecting a leak according to an embodiment may determine whether the battery cell B leaks by capturing the swelling of the battery cell B. In addition, the apparatus for inspecting a leak according to an embodiment may more precisely determine whether the battery cell B leaks by measuring the concentration of total volatile organic compound (TVOC) (referred to as TVOC measurement hereinafter) of a gas forcibly sucked from the receiving space G of the battery cell B. As an example, the apparatus for inspecting a leak according to an embodiment may include both a configuration for measuring the swelling of the battery cell B and a configuration for TVOC measurement. The leak inspection using the apparatus according to an embodiment may mainly perform swelling measurement of the battery cell B, additionally perform concentration measurement of total volatile organic compound (TVOC), and precisely determine whether the battery cell B leaks based on the measurement results.

The TVOC measurement may be performed after the swelling measurement of the battery cell B. More specifically, the TVOC measurement may be performed after destroying the vacuum atmosphere for measuring the swelling of the battery cell B. In the TVOC measurement, since a suction pressure provided at a relatively low pressure is provided to the receiving space G for the battery cell B, an internal gas of the receiving space is sucked and the TVOC sensor VTS arranged on a suction path of the internal gas is operated and accordingly, the TVOC concentration may be measured from the sucked internal gas. For this purpose, in the TVOC measurement operation, the TVOC pipe valve VT connected to the receiving space G of the battery cell B is switched to an on-state, and the internal gas of the receiving space G may be allowed to flow to the TVOC sensor VTS through the TVOC pipe valve VT through a fluid pump (not shown) fluidly connected to the TVOC pipe valve VT. The TVOC sensor VTS may be arranged on a flow path of the internal gas sucked from the inside of the receiving space G to measure the concentration of the TVOC from the sucked internal gas.

Electrolyte (not shown) may be received inside the battery cell B together with the electrode assembly BC (see FIG. 4), and the electrolyte (not shown) may include volatile organic compound. In this case, an organic compound component of an electrolyte may be extracted from an internal gas sucked from a defective battery cell B in which an exterior material BP (see FIG. 4) is damaged, or the receiving space G in which a defective battery cell B is received. The organic compound component of the electrolyte is not extracted from an internal gas sucked from a normal battery cell B in which an exterior material BP (see FIG. 4) is good, or the receiving space G in which a normal battery cell B is received. Accordingly, the TVOC concentration measured in the TVOC operation may provide a reference for determining whether the battery cell B leaks.

The above-described measurements of the thicknesses before vacuum and after vacuum for the battery cell B, that is, the swelling measurement of the battery cell B may be individually performed on each battery cell B, and the TVOC measurement may be performed in unit of a seat jig ZG. As an example, even when battery cells B are determined as being defective based on the TVOC results, whether a battery cell B is a defective battery cell among the plurality of battery cells B constituting a unit of the seat jig ZG may be determined based on whether swelling occurs in each battery cell B. In the leak inspection of a battery cell B to which the apparatus according an embodiment is applied, swelling measurement of the battery cell B is mainly performed and TVOC measurement may be additionally performed. Whether each individual battery cell B leaks may be determined depending on whether swelling is captured.

More specifically, in the TVOC measurement, a TVOC concentration is measured for an internal gas sucked from a plurality of battery cells B received in the same seat jig ZG. The internal gas forcibly sucked through the TVOC pipe valve VT corresponds to a total sum of internal gases sucked from different receiving spaces G. As an example, this is because the different receiving spaces G may be fluidly connected to each other inside the first sealing member S1 that seals between the upper chamber UC and the lower chamber LC, and suction for the different receiving spaces G may be performed through the TVOC pipe valve VT arranged between these receiving spaces G.

The TVOC measurement is performed after vacuum setting that sets the pressure of the receiving space G in which the battery cell B is received to the second pressure, which is vacuum, and vacuum destroying. Accordingly, the TVOC measurement may be performed with an external impurity gas removed from the receiving space G of the battery cell B. In the vacuum destroy operation, even when the destroy pipe valve R is switched to an on-state and the vacuum chamber VC is set to the relatively high third pressure (ex. the atmospheric pressure) by connecting the inside and the outside of the vacuum chamber VC to each other, external air may flow into the vacuum chamber VC through filtering of the destroy pipe valve R such that an external impurity gas is not introduced to the inside of the vacuum chamber VC. Accordingly, in the TVOC measurement, only volatile organic compound due to the damage of the battery cell B may be captured with an influence of an external impurity gas, particularly, a volatile organic compound flowing from the outside minimized.

In the measurement of a thickness after vacuum for determining whether swelling occurs in the battery cell B, the pressure of the receiving space G in which the battery cell B is received is set to the second pressure of vacuum lower than the first pressure (ex. the atmospheric pressure). In this case, the second pressure may be set lower than the atmospheric pressure corresponding to the first pressure and set higher than an inner pressure of a normal battery cell B in which a leak does not occur. This is because, when the second pressure set in the measurement of a thickness after vacuum is set lower than an inner pressure of a normal battery cell B in which an exterior material BP is not damaged, swelling occurs to all battery cells B without discrimination between a normal battery cell and a defective battery cell and thus a battery cell cannot be determined as normal or defective based on whether swelling occurs. In an embodiment, the second pressure may be set lower than the atmospheric pressure, which is the first pressure, and higher than the inner pressure of a normal battery cell B in which a leak does not occur. As an example, the second pressure may be set lower than 760 torr, which is the atmospheric pressure, and within a range higher than 10 torr, which is the inner pressure of a normal battery cell B, that is, within a range of 10 torr to 760 torr.

Hereinafter, the method of inspecting a leak according to an embodiment is described for each process operation.

Figure 5:
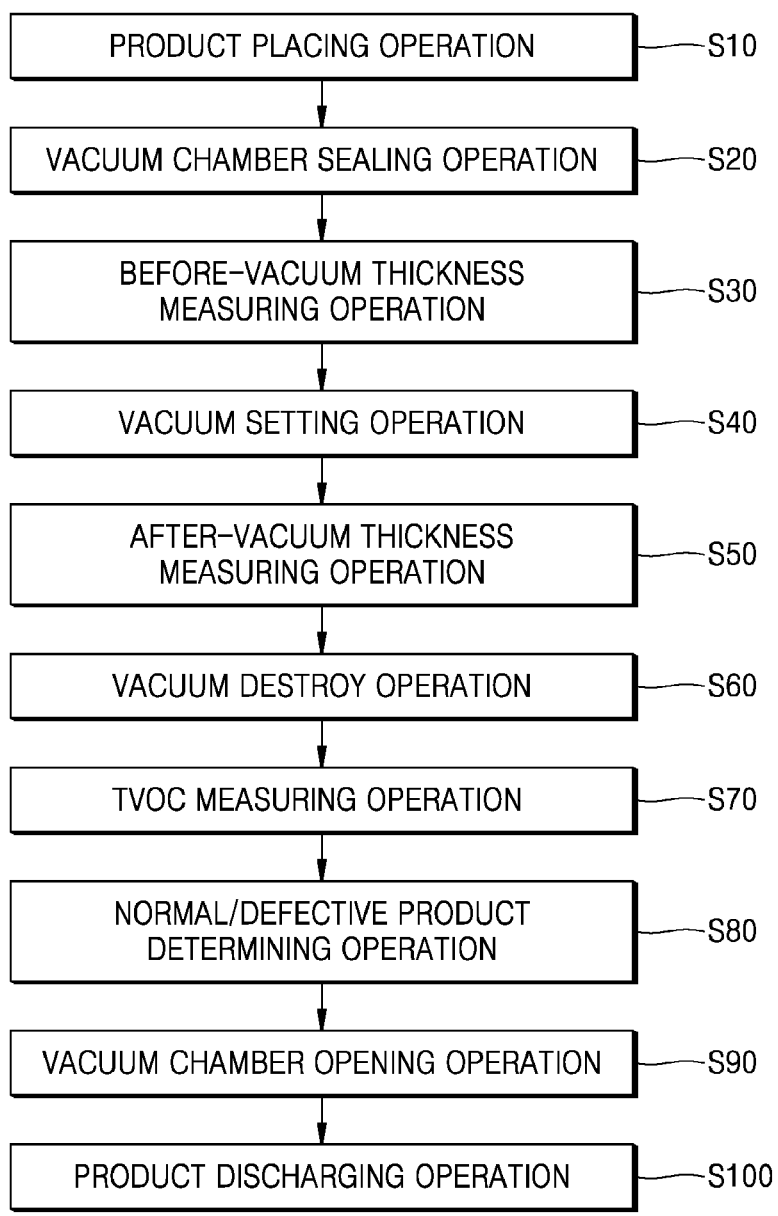
FIG. 5 is a process flowchart of a method of inspecting a leak.
Figure 6:
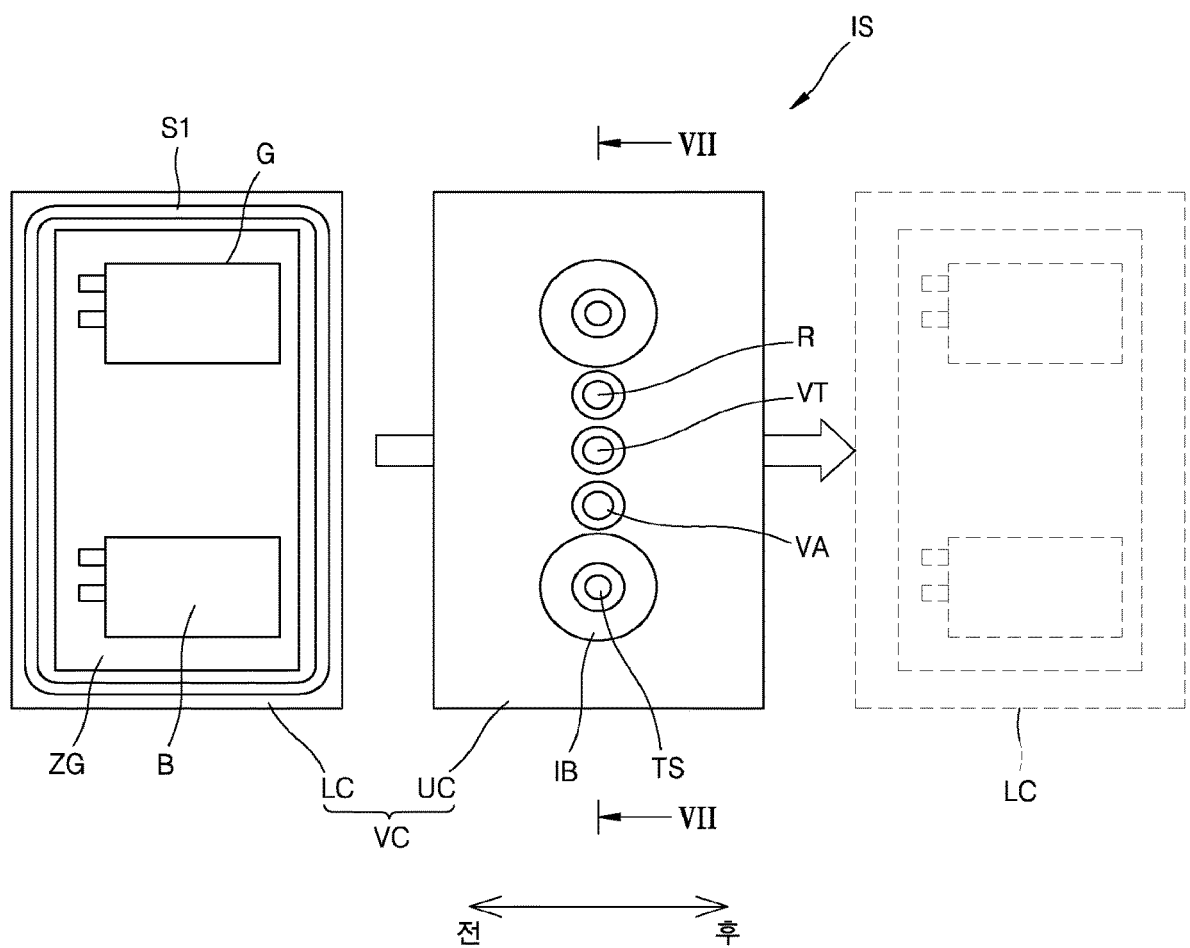
FIGS. 6 to 8 are views of driving of an apparatus for inspecting a leak applied to the method of inspecting a leak.
Figure 7:
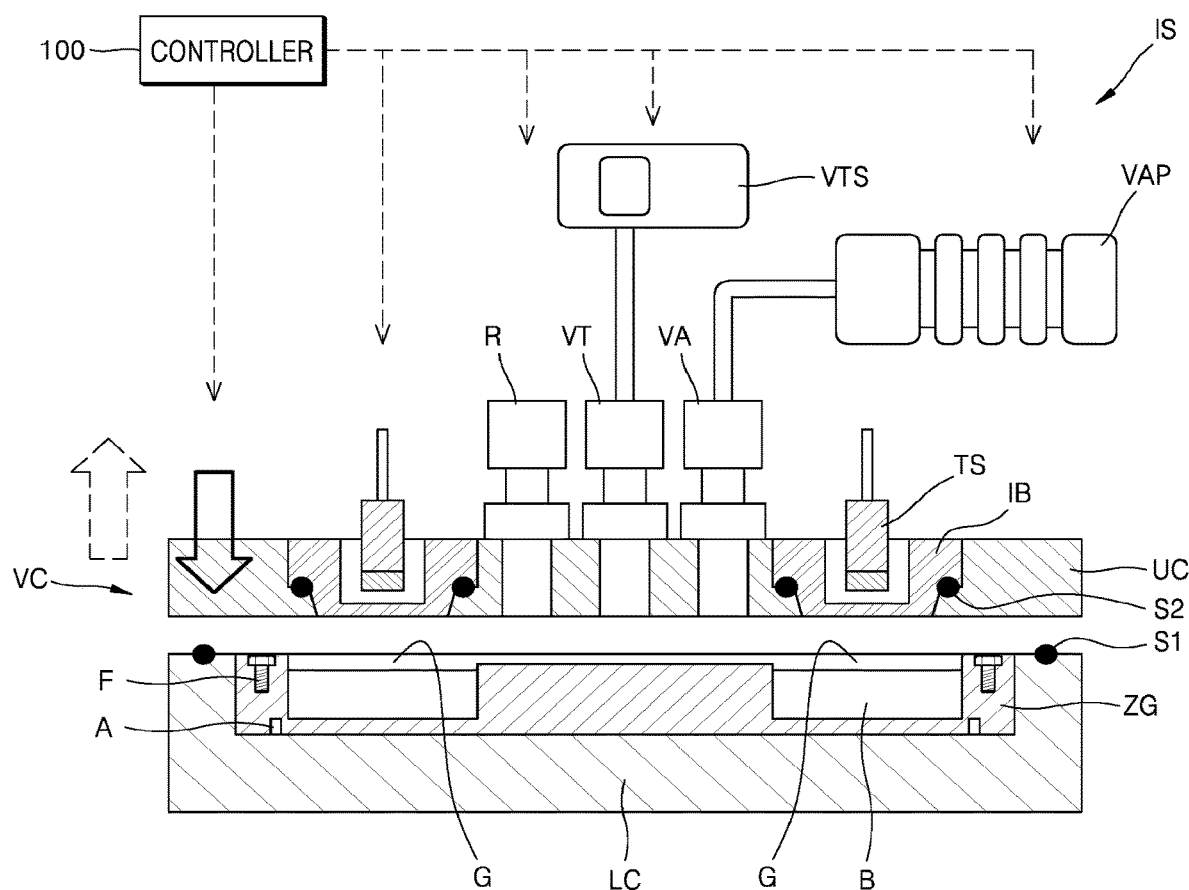
Figure 8:
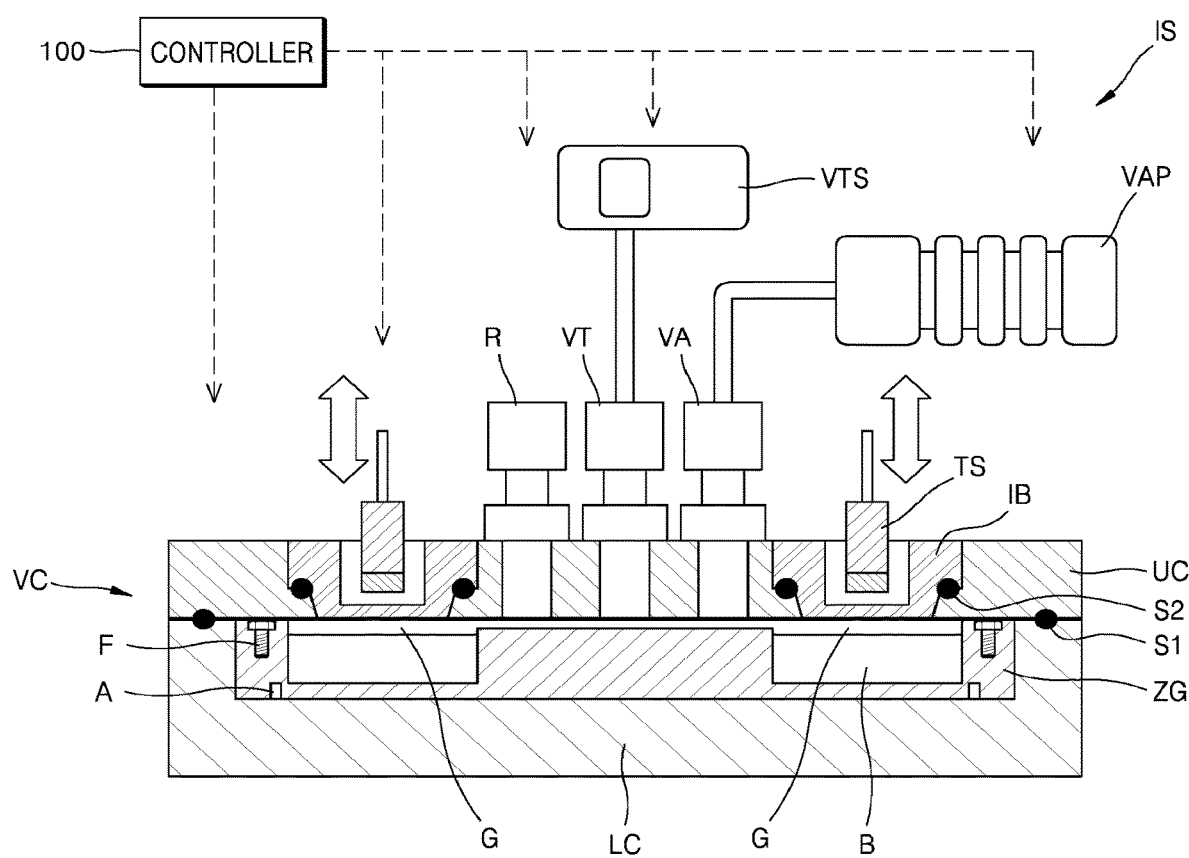
Figure 9:
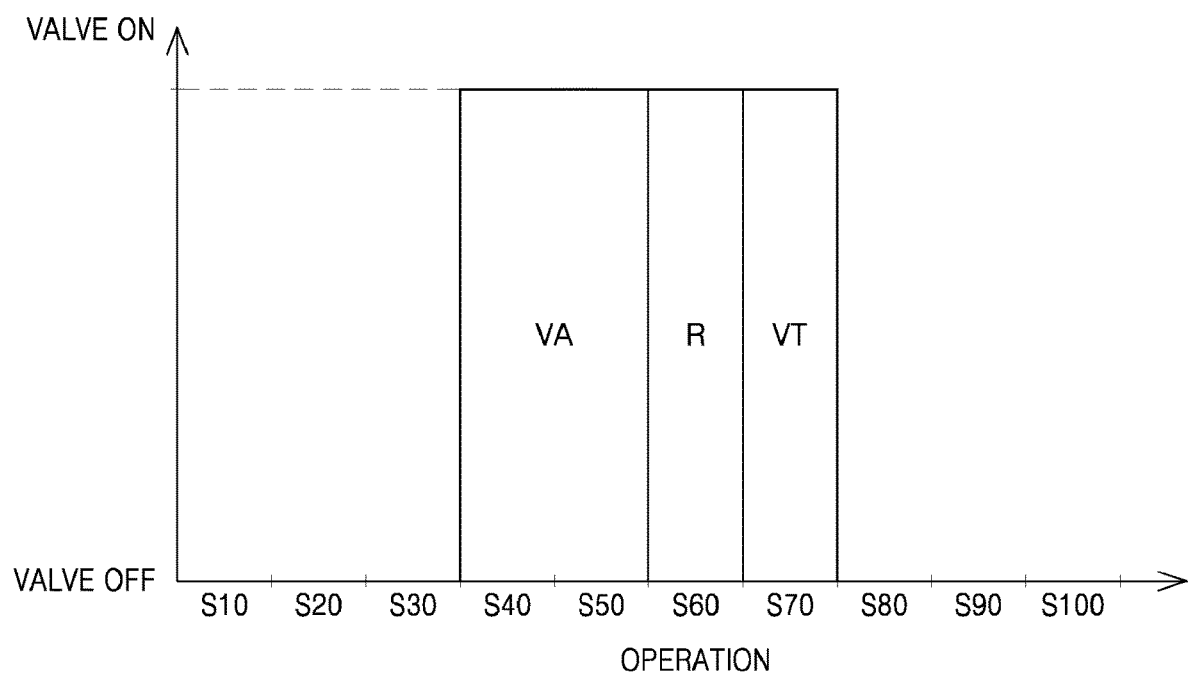
FIG. 9 is a view showing, for each process, valve ON/valve OFF operations of various pipe valves VA, VT, and R of an apparatus for inspecting a leak shown in FIG. 8.

FIG. 5 is a process flowchart of a method of inspecting a leak. FIGS. 6 to 8 are views of driving of an apparatus for inspecting a leak applied to the method of inspecting a leak, and FIGS. 7 and 8 are cross-sectional views of the apparatus for inspecting a leak, taken along line VII-VII of FIG. 6. FIG. 9 is a view showing, for each process, valve ON/valve OFF operations of various pipe valves VA, VT, and R of the apparatus for inspecting a leak shown in FIG. 8.

Referring to FIG. 5, leak inspection to which the apparatus according to an embodiment is applied may include a product placing operation S10, a vacuum chamber sealing operation S20, a before-vacuum thickness measuring operation S30, a vacuum setting operation S40, an after-vacuum thickness measuring operation S50, a vacuum destroy operation S60, a TVOC measuring operation S70, a normal/defective product determining operation S80, a vacuum chamber opening operation S90, and a product discharging operation S100.

Referring to FIG. 6, in the product placing operation S10, the lower chamber LC may be driven in one direction (the back-and-forth direction) to supply a battery cell B toward the inspection stage IS and discharge an inspection-completed battery cell B. The lower chamber LC that receives a plurality of battery cells B may serve as a transfer means that approaches toward the inspection stage IS over which the upper chamber UC waits to supply the battery cell B, and is driven in one direction (the back-and-forth direction) to be away from the inspection stage IS after the inspection is completed to discharge an inspection-completed battery cell B.

As an example, the product placing operation S10 may include an operation of assembling the seat jig ZG in which the receiving spaces G for a plurality of battery cells B is prepared to the lower chamber LC, and an operation of moving the lower chamber LC in which the plurality of battery cells B are received to a waiting position of the upper chamber UL.

As an example, the upper chamber UC may wait for the lower chamber LC over the inspection stage IS at a set position in one direction (the back-and-forth direction), descend in a direction facing the lower chamber LC with respect to the lower chamber LC that approaches the inspection stage IS that faces the upper chamber UC, and be in close contact with the lower chamber LC.

The seat jig ZG in which the plurality of battery cells B are received inside the lower chamber LC may be transferred together with the lower chamber LC, and the apparatus according to an embodiment does not perform leak inspection on a battery cell B basis but may perform leak inspection in unit of the seat jig ZG in which a plurality of battery cells B are seated. That is, the upper chamber UC and the lower chamber LC that are in close contact with each other to face each other in the inspection stage IS may simultaneously seal the plurality of receiving spaces G inside the first sealing member S1 therebetween. The plurality of receiving spaces G may be fluidly connected to each other substantially to share a set pressure according to pressure adjustment corresponding to ON/OFF of the pipe valve and may be controlled to a set pressure. Accordingly, respective inspection operations described below may be simultaneously performed on the plurality of receiving spaces G.

Referring to FIGS. 7 and 8, the vacuum chamber sealing operation S20 is performed after the product placing operation S10. That is, when the lower chamber LC reaches an inspection position (the inspection stage IS), the upper chamber UC may descend toward the lower chamber LC and be in close contact with the lower chamber LC. Here, the upper chamber UC may be in close contact with the lower chamber LC at a preset pressure such that the upper chamber UC and the lower chamber LC are sufficiently sealed with the first sealing member S1 therebetween. The upper chamber UC and the lower chamber LC may be in close contact with each other to face each other and thus the vacuum chamber VC is sealed, and then the pressure of the receiving space G in which the battery cell B is received may be controlled by ON/OFF of the various pipe valves driven according to a control signal of the controller 100. Inspection operations described below may be performed under the controlled pressure.

Referring to FIG. 8, the before-vacuum thickness measuring operation S30 is performed after the vacuum chamber sealing operation S20. That is, under a state in which the upper chamber UC and the lower chamber LC are in close contact with each other and thus the vacuum chamber VC is sealed, the thickness measuring sensor TS of the upper chamber UC and the battery cell B of the lower chamber LC are arranged at positions facing each other. Under this state, the thickness measuring sensor TS measures the before-vacuum thickness of the battery cell B according to a control signal of the controller 100. The measuring of the before-vacuum thickness may be performed under the relatively high first pressure (ex. the atmospheric pressure). As an example, the thickness of the battery cell B may be measured under the first pressure (ex. the atmospheric pressure). As an example, the measurement of the before-vacuum thickness is performed under a state in which the upper chamber UC and the lower chamber LC are in close contact with each other and thus the vacuum chamber VC is sealed, but the various pipe valves fluidly connected to the receiving space G sealed by the upper chamber UC and the lower chamber LC are maintained at an off-state, and accordingly, the receiving space G may be set to the first pressure (ex. the atmospheric pressure), which is the same as the outside of the vacuum chamber VC.

The thickness measuring sensors TS may respectively measure the thicknesses of the battery cells B at positions above the battery cells B received in the respective receiving spaces G. The thicknesses of the battery cells B measured by the thickness measuring sensors TS at the different positions may be transmitted to the controller 100 together with identification information of the relevant battery cells B.

The vacuum setting operation S40 is performed after the before-vacuum thickness measuring operation S30. That is, after the measuring of the before-vacuum thickness, vacuum setting may be performed in which the vacuum pipe valve VA is switching to an on-state with other pipe valves turned off, and a vacuum fluid pump VAP fluidly connected to the vacuum pipe valve VA is driven to set the pressure of the receiving space G to the relatively low second pressure. As an example, in the vacuum setting, the pressure of the receiving space G may be set to a vacuum pressure lower than the first pressure (ex. the atmospheric pressure). In this case, the vacuum pipe valve VA may be connected to the upper chamber UC and connected to a position of the upper chamber UC between the different receiving spaces G to simultaneously provide a negative pressure to the plurality of receiving spaces G. The plurality of receiving spaces G are sealed inside the first sealing member S1 between the upper chamber UC and the lower chamber LC and set to and maintained at a low pressure of the second pressure when the vacuum pipe valve VA is switched to an on-state.

The after-vacuum thickness measuring operation S50 may be performed after the vacuum setting operation S40. Similar to the before-vacuum thickness measuring operation, in the after-vacuum thickness measuring operation, each thickness measuring sensor TS arranged at a position above each battery cell B may measure the thickness of the relevant battery cell B under vacuum in which the relatively low second pressure is maintained. The measured thickness information may be transmitted to the controller 100 together with identification information of the relevant battery cell B. The controller 100 may compare information of the before-vacuum thickness with information of the after-vacuum thickness to determine whether swelling occurs, and transfer the measured results to an operator to allow the operator to determine whether swelling occurs.

The vacuum destroy operation S60 is performed after the after-vacuum thickness measuring operation S50. In the vacuum destroy operation, with the other pipe valves turned off, the destroy pipe valve R is switched to an on-state to release the vacuum state of the receiving space G and set the inside of the receiving space G to the relatively higher third pressure (ex. the atmospheric pressure) than the second pressure (the vacuum pressure). As an example, the pressure of the receiving space G may be set to the atmospheric pressure or the relatively high third pressure close to the atmospheric pressure. The destroy pipe valve R may be on/off-driven to selectively connect the inside of the vacuum chamber VC to the outside of the vacuum chamber VC. When the destroy pipe valve R is switched to an on-state, the pressure of the inside of the vacuum chamber VC may be set to the third pressure (ex. the atmospheric pressure), which is the same as the outside. The destroy pipe valve R may be mounted at a position of the upper chamber UC between the plurality of receiving spaces G and fluidly connected to the plurality of receiving spaces G and may simultaneously set the plurality of receiving spaces G to the third pressure (ex. the atmospheric pressure).

The TVOC measuring operation S70 may be performed after the vacuum destroy operation S60. In the TVOC measuring operation, with the other pipe valves turned off, the TVOC pipe valve VT is switched to an on-state to suck an internal gas of the receiving space G and measure the concentration of TVOC from the sucked internal gas. When the TVOC pipe valve VT is switched to an on-state, the internal gas of the receiving space G is forcibly introduced to a suction flow path through the TVOC pipe valve VT by the fluid pump (not shown) fluidly connected to the TVOC pipe valve VT. In addition, the TVOC sensor VTS arranged on the suction flow path may measure the TVOC concentration from the internal gas forcibly introduced from the receiving gas G and transfer the measured results to the controller 100.

In the TVOC measuring operation, unlike the before-vacuum thickness measuring operation and the after-vacuum thickness measuring operation, individual measurement is not performed on each battery cell B and collective measurement for a plurality of battery cells B may be performed on a seat jig ZG basis. That is, rather than determining whether each battery cell B leaks based on the measured results from the TVOC sensor VTS, it may be possible to finally determine whether a leak occurs by determining whether a leak occurs with reference to swelling measurement obtained by measuring a before-vacuum thickness and an after-vacuum thickness prior to the TVOC measurement, and by determining again whether a leak occurs with reference to the additional TVOC measurement results. The TVOC pipe valve VT may be mounted on the upper chamber UC and fluidly connected to the plurality of receiving spaces G at a position of the upper chamber UC between the plurality of receiving spaces G, and the TVOC sensor VTS may measure the TVOC concentration of the entire gas forcibly introduced from the plurality of receiving spaces G.

The TVOC sensor VTS may transmit the measurement result to the controller 100, and the controller 100 may determine a leak occurs depending on whether a concentration higher than the reference value is measured based on information regarding the TVOC concentration, and transmit the measured results to an operator to allow the operator to determine whether a leak occurs. As an example, when the TVOC concentration is higher than the reference value, it may be determined that the higher TVOC concentration occurs due to a volatile component of the electrolyte that leaks from a defective battery cell.

The normal/defective product determining operation S80 of the battery cell may be performed after the TVOC measuring operation S70. The normal/defective product determining operation may be performed by the controller 100 that receives the information regarding a thickness change measured in the before-vacuum thickness measuring operation and the after-vacuum thickness measuring operation. That is, the controller 100 may compare a before-vacuum thickness of each battery cell B with an after-vacuum thickness each received from the thickness measuring sensor TS, determine whether swelling occurs to the relevant battery cell B, and determine that the battery cell B in which the after-vacuum thickness increases beyond the reference value compared to the before-vacuum thickness, that is, the battery cell B in which swelling occurs is a defective battery cell.

In addition, the controller 100 may determine that a battery cell B is a defective battery cell depending on whether a TVOC concentration detected in the TVOC measuring operation is higher than the reference value. In this case, since the TVOC measuring is performed on a plurality of battery cells B on a seat jig ZG basis, whether a battery is a normal/defective battery may be determined on a battery basis based on whether swelling occurs to each battery, and the TVOC measurement results may be utilized as additional information for determining the existence of a defective battery.

The determination of a normal/defective battery may be performed by the controller 100 that receives measurement results from respective sensors, that is, the thickness measuring sensor TS and the TVOC sensor VTS, or may be performed by an operator who receives the measurement results from the controller 100. For the determination of a normal/defective battery to be performed by the controller 100, a clear determination reference needs to be set. As an example, a reference value with respect to a thickness difference between a before-vacuum thickness and an after-vacuum thickness may be prepared, and a thickness change exceeding the reference value may be determined as swelling (or a leak). For the TVOC measurement results, a reference value with respect to the TVOC concentration may be prepared, and a TVOC concentration exceeding the reference value may be determined as a leak.

The vacuum chamber opening operation S90 and the product discharging operation S100 may be performed after the normal/defective product determining operation S80 of the battery cell. That is, as described above, after the leak inspection is completed, the upper chamber UC is driven to ascend in a direction away from the lower chamber LC to discharge an inspection-completed battery from the inspection stage IS and open the vacuum chamber VC. In addition, the lower chamber LC released from the upper chamber UC is driven in one direction (the back-and-forth direction) to be away from the upper chamber UC, and the inspection-completed battery is discharged from the inspection stage IS together with the lower chamber LC. The lower chamber LC that is removed from the inspection stage IS, after the seat jig ZG in which a new battery is seated is replaced, may be re-introduced into a series of inspection operations that begins from a product placing operation, for leak inspection of a new battery.

Though the present disclosure is described with reference to the embodiments shown in the drawings, these are provided as examples, and it would be understood by those of ordinary skill in the art that various modifications and equivalents thereof may be made from the embodiments. Therefore, the scope of the present disclosure should be defined by claims.

INDUSTRIAL APPLICABILITY

The present disclosure is applicable to an apparatus and a method for inspecting a leak of a battery cell that is rechargeable and dischargeable as an energy source.

The invention claimed is:

1. An apparatus for inspecting for a battery cell leak, comprising:
a vacuum chamber including an upper chamber and a lower chamber and configured to set a plurality of receiving spaces to a controlled pressure different from a first pressure, the upper chamber and the lower chamber being arranged to face each other with the plurality of receiving spaces therebetween and providing sealing for the plurality of receiving spaces, wherein the plurality of receiving spaces are configured to receive a plurality of battery cells respectively;
one or more pipe valves connected to the upper chamber between the plurality of receiving spaces and fluidly connected to the plurality of receiving spaces to set the controlled pressure different from the first pressure, wherein the controlled pressure is common among the plurality of receiving spaces, the one or more pipe valves including a vacuum pipe valve fluidly connected to the plurality of receiving spaces for the plurality of battery cells to set the plurality of receiving spaces to a second pressure less than the first pressure; and
a thickness measuring sensor configured to measure a before-vacuum thickness of the battery cell under the first pressure and measure an after-vacuum thickness of the battery cell under the second pressure.

2. The apparatus of claim 1, wherein a seat jig is assembled in the lower chamber to form a releasable assembly with the lower chamber, wherein the plurality of receiving spaces are provided in the seat jig.

3. The apparatus of claim 2, wherein the apparatus performs a leak inspection for the seat jig.

4. The apparatus of claim 1, further comprising a controller configured to determine the battery cell leak based on a thickness difference between the before-vacuum thickness and the after-vacuum thickness.

5. The apparatus of claim 4, wherein the controller compares the before-vacuum thickness with the after-vacuum thickness and determines that a leak occurs in a battery cell in which swelling occurs.

6. The apparatus of claim 4, wherein the controller compares a reference value set in advance with the thickness difference and determines that a leak occurs in a battery cell in which the thickness difference exceeding the reference value is measured.

7. The apparatus of claim 1, further comprising
a total volatile organic compound (TVOC) pipe valve configured to suck an internal gas from an inside of the plurality of receiving spaces for the plurality of battery cells; and
a total volatile organic compound (TVOC) sensor arranged on a sucking flow path of the internal gas to measure a concentration of total volatile organic compound from the internal gas.

8. The apparatus of claim 7, further comprising a controller configured to synthesize information regarding the before-vacuum thickness and the after-vacuum thickness transmitted from the thickness measuring sensor and information regarding the concentration of the total volatile organic compound transmitted from the TVOC sensor to determine whether a battery cell leaks.

9. The apparatus of claim 7, further comprising a destroy pipe valve configured to set the plurality of receiving spaces for the plurality of battery cells to a third pressure higher than the second pressure,
wherein the TVOC pipe valve provides a negative pressure lower than the third pressure to forcibly suck the internal gas from the inside of the plurality of receiving spaces set to the third pressure.

10. The apparatus of claim 9, wherein
the vacuum pipe valve, the TVOC pipe valve, and the destroy pipe valve are arranged in a position of the upper chamber between the plurality of receiving spaces, fluidly connected to the plurality of receiving spaces, and set a pressure shared by the plurality of receiving spaces.

11. The apparatus of claim 1, wherein the thickness measuring sensor is provided at a position of the upper chamber that faces the plurality of receiving spaces and arranged to face a battery cell inside the plurality of receiving spaces.

12. The apparatus of claim 1, wherein the thickness measuring sensor is a non-contact type eddy current sensor,
wherein an insulating block is assembled in the upper chamber, the insulating block surrounding and insulating the thickness measuring sensor.

13. The apparatus of claim 1, wherein the thickness measuring sensor is provided in plural to correspond to the plurality of receiving spaces, respectively.

14. The apparatus of claim 1, wherein the first pressure corresponds to an atmospheric pressure.

15. A method of inspecting a battery cell leak using an inspection apparatus including a vacuum chamber including an upper chamber and a lower chamber and having a plurality of receiving spaces therebetween for receiving a plurality of battery cells respectively, the inspection apparatus further including one or more pipe valves for controlling a pressure of an inside of the vacuum chamber, the one or more pipe valves connected to the upper chamber between a plurality of receiving spaces and fluidly connected to the plurality of receiving spaces to set a controlled pressure different from a first pressure, wherein the controlled pressure is common among the plurality of receiving spaces, the method comprising:
placing the plurality of battery cells to an inspection position such that an inspection stage is provided;
sealing the plurality of receiving spaces by lowering the upper chamber toward the lower chamber;
maintaining a vacuum pipe valve of the one or more pipe valves in an off-state to maintain the plurality of receiving spaces at the first pressure which is the same pressure as before the sealing of the vacuum chamber and measuring a before-vacuum thickness of the battery cell under the first pressure;
switching the vacuum pipe valve to an on-state to set the plurality of receiving spaces of the battery cells to a second pressure lower than the first pressure; and
measuring an after-vacuum thickness of the battery cell under the second pressure.

16. The method of claim 15, further comprising determining the battery cell leak based on a thickness difference between the before-vacuum thickness and the after-vacuum thickness.

17. The method of claim 16, wherein the determining of the battery cell leaks include comparing the before-vacuum thickness with the after-vacuum thickness and determining that a leak occurs in at least one of the plurality of battery cells in which swelling occurs.

18. The method of claim 15, further comprising
switching a destroy pipe valve fluidly connected to the plurality of receiving spaces for the plurality of battery cells to an on-state to set the plurality of receiving spaces to a third pressure higher than the second pressure; and
forcibly sucking an internal gas from an inside of the plurality of receiving spaces set to the third pressure and measuring a concentration of total volatile organic compound from the sucked internal gas.

19. The method of claim 18, further comprising synthesizing a thickness difference between the before-vacuum thickness and the after-vacuum thickness, and the concentration of the total volatile organic compound to determine the battery cell leak.

20. The method of claim 15, wherein the placing of the plurality of battery cells to the inspection position includes:
assembling a seat jig in the lower chamber, wherein the plurality of receiving spaces for the plurality of battery cells are provided in the seat jig; and
moving the lower chamber receiving the plurality of battery cells to a waiting position of the upper chamber.

21. The method of claim 15, further comprising raising the upper chamber in a direction away from the lower chamber to discharge an inspection-completed battery cell.

* * * * *